UNITED STATES PATENT OFFICE.

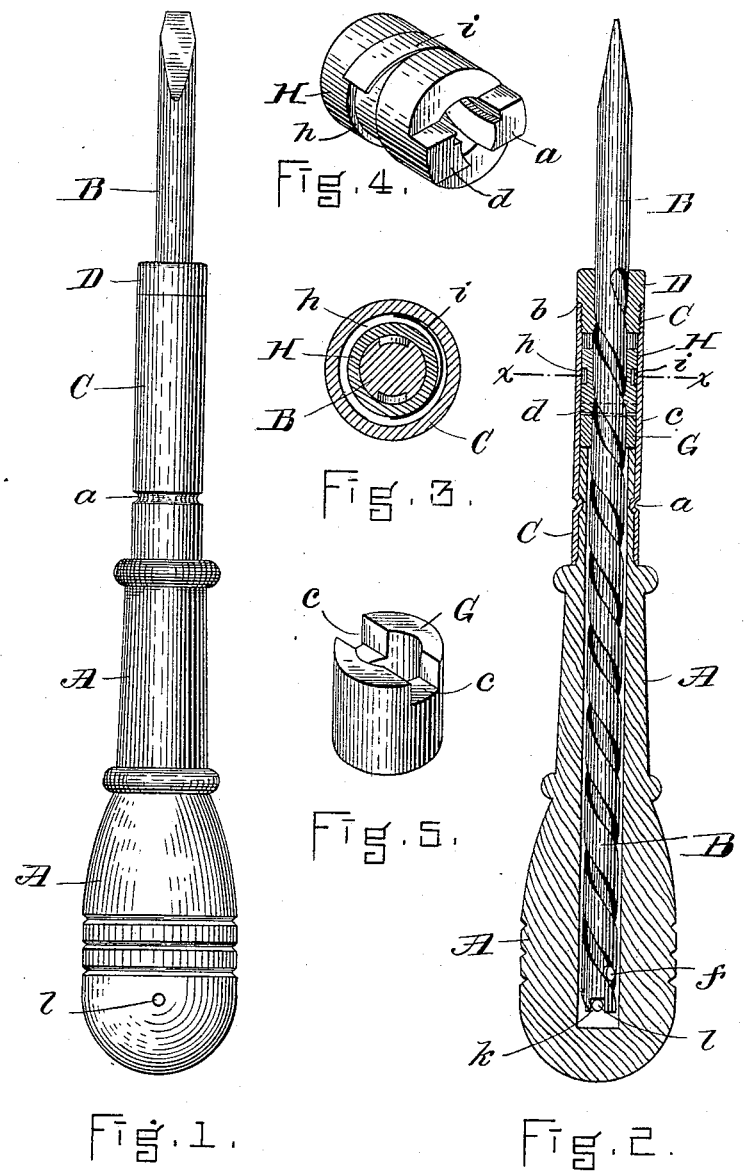

FRANK A. HOWARD, OF BELFAST, MAINE.

SCREW-DRIVER.

SPECIFICATION forming part of Letters Patent No. 470,001, dated March 1, 1892.

Application filed May 16, 1891. Serial No. 393,012. (No model.)

*To all whom it may concern:*

Be it known that I, FRANK A. HOWARD, a citizen of the United States, residing at Belfast, in the county of Waldo and State of Maine, have invented certain Improvements in Screw-Drivers, of which the following is a full, clear, and exact description, reference being had to the accompanying drawings, making part of this specification, in which—

Figure 1 is a side view of a screw-driver constructed in accordance with my invention. Fig. 2 is a longitudinal central section of the same. Fig. 3 is a section on the line $x\,x$ of Fig. 2. Fig. 4 is an enlarged perspective view of the rotating nut and its friction-spring. Fig. 5 is an enlarged perspective view of the clutch for the rotating nut.

My invention relates to an improvement in the screw-driver for which Letters Patent of the United States No. 157,087 were granted to Isaac Allard November 24, 1874, and has for its object to render the implement more certain and reliable in its action than before; and to this end my invention consists in the combination, with the tubular socket secured to the handle and provided in its interior with a clutch, and the spirally-grooved spindle or bit, of a rotary longitudinally-sliding nut placed upon the spindle and adapted to engage with the clutch, said nut being provided with a friction-spring, which bears against the wall of the chamber within which the nut is placed and creates sufficient friction to prevent said nut from revolving too freely when the spindle is forced into the handle, thus insuring the nut being carried back by said spindle into engagement with its clutch to cause it to be locked, as required. As heretofore constructed without this spring, it frequently happened that when the attempt was made to drive a screw with the implement in a vertical position, point downward, the nut would revolve so freely upon the shank that the latter would not carry it back into engagement with the stationary clutch, and consequently the spindle or bit would not revolve as desired. My present improvement entirely obviates this difficulty and renders the tool certain and reliable in any position in which it may be placed, as hereinafter more particularly set forth.

My invention also consists in providing the inner end of the spirally-grooved shank with a square or angular notch, which, when the shank is forced entirely in, engages with a pin passing transversely through the handle, whereby the spindle is locked and prevented from rotating independently of the handle in either direction to enable the screw-driver to be used in the ordinary way.

In the said drawings, A represents the handle of the screw-driver, which is formed hollow nearly its entire length to receive the spirally-grooved spindle B, the outer end of which is made wedge-shaped and forms the screw-driving bit.

C is a tubular metallic socket or sleeve, which is immovably secured upon the smaller end of the handle A, the interior of the socket being, preferably, roughened by cutting longitudinal grooves therein with burr edges, whereby when the socket is forcibly driven onto the handle it will be prevented from rotating independently thereof. After the socket is driven into place an annular groove $a$ is indented therein by means of a suitable tool correspondingly forcing the metal inward into the wood on the line of the groove, as seen in Fig. 2, whereby all liability of the separation of the socket and handle is avoided.

The outer end of the socket C is screw-threaded in its interior to receive a correspondingly-threaded cap D, having a shoulder $b$, which rests upon the end of the socket, making a flush joint, said cap having an aperture through which the spirally-grooved spindle is free to slide.

Within the socket C, a short distance from its outer end, is immovably secured a collar or bushing G, the front end of which is cut away to form angular notches $c\,c$, with which engage the angular teeth or projections $d\,d$, formed at the inner end of a rotary nut H, which fits the spirally-grooved spindle B, and is arranged thereon between the collar G and the cap D, the chamber thus formed between the cap and the collar G being of sufficient length to permit the nut H to slide longitudinally a short distance therein to engage with the clutch formed by the notches $c\,c$ or be disengaged therefrom. At the inner end of the spindle B, driven through into the spiral grooves, is a stop-pin $f$, which when the spindle is drawn out to its full extent contacts with the nut H and serves as a stop to prevent the spindle from being detached from the handle.

On taking hold of the spindle B and drawing it out with the hand the nut H will be instantly moved forward therewith and its teeth d thereby disengaged from the notches c c of the clutch G, when it will revolve freely upon the spindle, thus permitting the latter to be drawn out without rotating upon its axis. The wedge-shaped end of the spindle B thus extended is now placed in the slot or nick of the head of the screw to be driven and the operator then presses the handle toward the screw, which causes the nut H to be first moved by the spindle longitudinally inward or backward, causing its teeth to engage with the clutch G, when the nut H, being locked or held stationary by said clutch, the spindle will be caused to revolve as it is forced inward by the continued pressure upon the handle, thus turning the screw into the article, as desired.

The screw-driver as thus far described is substantially like that shown in the patent of Isaac Allard previously referred to, with the exception of the rotary nut H. This nut H is provided with an annular groove or recess h, within which, on one side of the nut, is secured a light flat spring i, which bears against the wall or interior of the socket C and acts as a brake, thereby creating sufficient friction between the two to prevent the nut from revolving too freely within its chamber when the spindle commences to be pressed inward, this checking of the free rotation of the nut enabling the spiral grooves of the spindle to act upon said nut in such manner as to cause it to be instantly carried backward into engagement with the clutch without regard to the position in which the implement is held, whereas with the old construction, if the implement was held point downward the nut would frequently revolve around the spindle without being forced backward into engagement with the clutch, in consequence of which the spindle would fail to rotate as desired, whereas by the employment of the spring i the engagement of the nut with the clutch is at all times insured, thus rendering the implement perfectly reliable under all conditions. When the nut is in place in its chamber, the spring i is pressed into the groove h and lies snugly therein flush with the surface of the nut. At the inner end of the spirally-grooved spindle B is formed a square notch k, which, when the spindle is forced into the handle to the limit of its inward movement, is adapted to engage with a pin l, passing transversely through the handle, whereby the spindle B is locked immovably with respect to the handle, and can thus be used as a screw-driver in the ordinary manner to turn a screw in or out.

What I claim as my invention, and desire to secure by Letters Patent, is—

1. In a screw-driver, the combination, with the tubular socket secured to the handle and provided in its interior with a clutch, and the spirally-grooved spindle or bit, of the rotary longitudinally-sliding nut placed upon the spindle and adapted to engage with the clutch, said nut being provided with a friction-spring adapted to bear against the walls of the chamber containing said nut to retard the rotation of the same, whereby the engagement of the nut with the clutch is insured when the spindle is pressed inward, substantially as described.

2. In a screw-driver, the combination, with the socket C, secured to the handle A and provided with a screw-cap D, the collar or clutch G, having notches c c, and the spirally-grooved spindle or bit B, of the rotary longitudinally-sliding nut H, revolving upon the spindle between the cap D and the clutch G and provided with a friction-spring i, adapted to lie within a groove or recess h, the free end of said spring bearing against the walls of the chamber containing the nut to insure the longitudinal movement of the latter by the spindle when pressed inward, substantially as set forth.

3. In a screw-driver, the combination, with the socket C, secured to the handle and provided with the clutch G, and the rotary nut H, adapted to engage therewith, of the spirally-grooved spindle or bit B, provided at its inner end with an angular notch k, and the pin l, passing transversely through the handle, said notch k being adapted to engage with the pin l, and thus lock the spindle when the latter has been forced into the handle, substantially as set forth.

Witness my hand this 9th day of May, A. D. 1891.

FRANK A. HOWARD.

In presence of—
R. F. DUNTON,
J. W. JONES.